S. TRUMBULL.
Bee Hive.
No. 2,539. 2 Sheets—Sheet 2. Patented April 6, 1842.
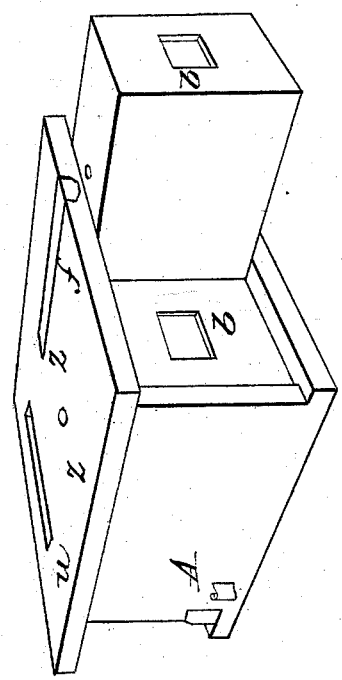
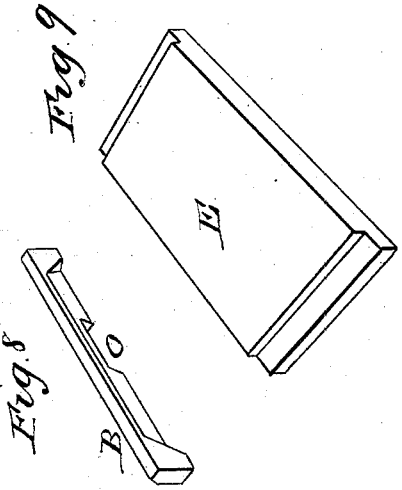
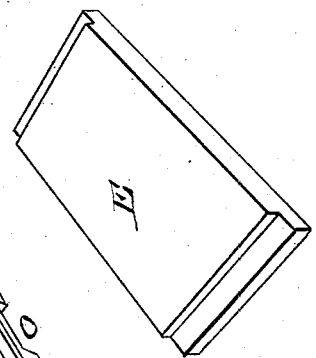
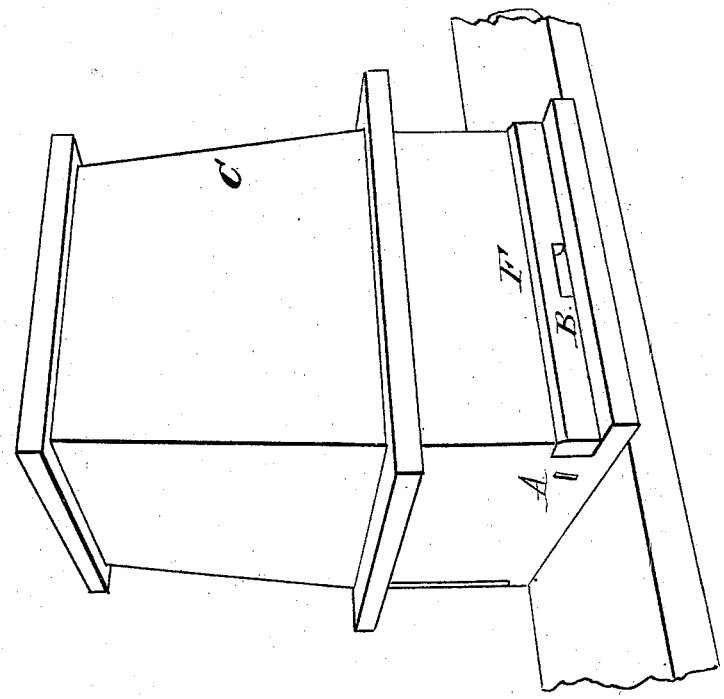

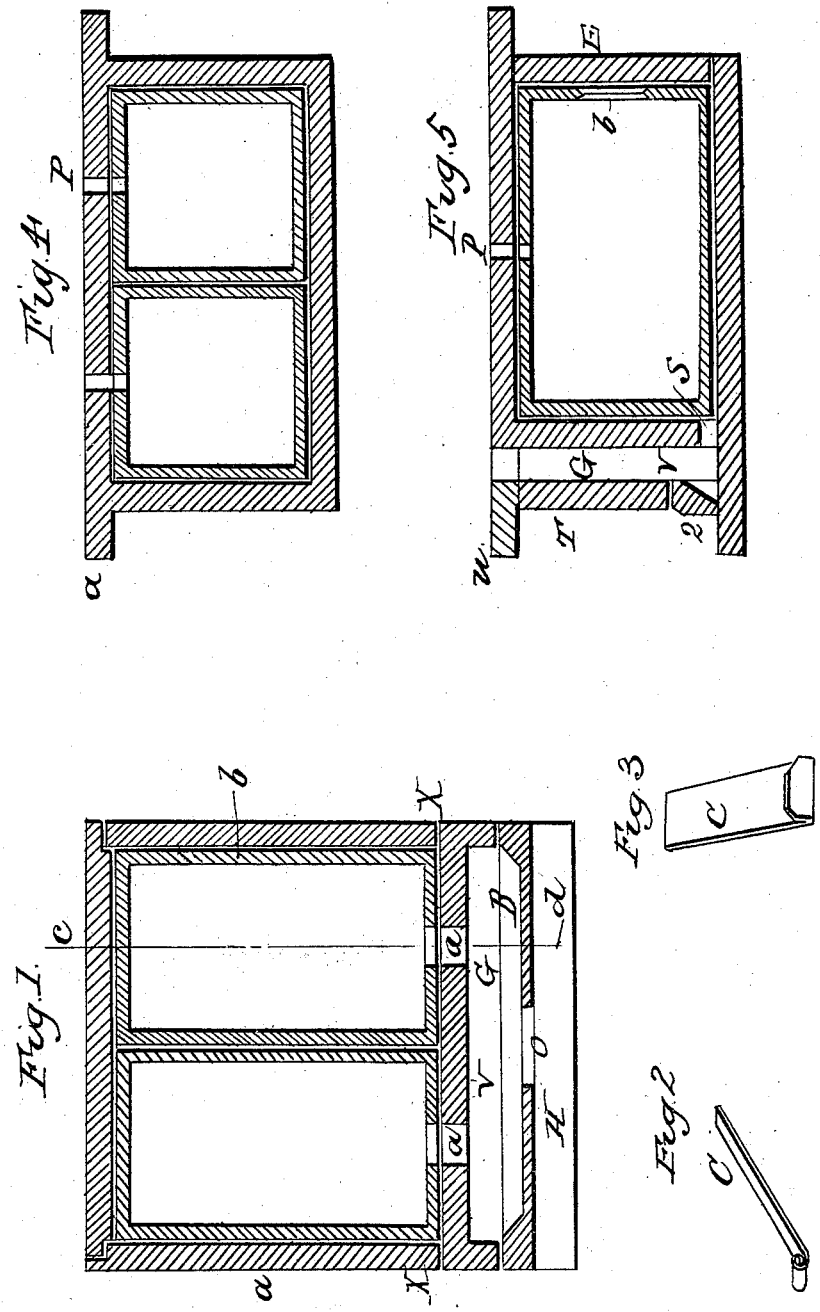

UNITED STATES PATENT OFFICE.

SHADRACH TRUMBULL, OF SUFFIELD, CONNECTICUT.

BEEHIVE.

Specification of Letters Patent No. 2,539, dated April 6, 1842.

*To all whom it may concern:*

Be it known that I, SHADRACH TRUMBULL, of Suffield, in the county of Hartford and State of Connecticut, have invented a new and useful Improvement on Beehives; and I do hereby declare that the following is a full, clear, and exact description of the construction and use of the same, reference being had to the annexed drawings, making a part of this specification, in which—

Figure 1 is the plan, Figs. 2 and 3 stops, Fig. 4 section on the line *a—b* on the plan, Fig. 5 section on the line *c—d* on the plan, Fig. 6, view of the front in connection with the common hive, Fig 7, view of the backside with the shutter detached and one box partly drawn out, Fig. 8, movable front, or mouthpiece, Fig. 9, shutter to the backside.

The plan Fig. 1 is the base, or ground floor of the hive being a square or oblong of a suitable size for a hive about 17 by 14 inches, which constitutes the whole area of the ground floor, being a board of suitable thickness. The side pieces near *a* and *b* and partition *v* resting on the same and fastened to it. The dotted line *a—b* shows Fig. 4 to be a transverse section of the hive the drawers or inner boxes are distinguished from the outer box or hive by white lines. The dotted line *c—d* likewise represents Fig. 5 to be a longitudinal section of the hive. The bases of the sides are viewed on the plan Fig. 1 at *a—b* which are about 14 inches long and 6 inches high, the white lines showing the outer box, and two thinner boxes inclosed, between space *g* and the white line at the front end of the inner boxes is a partition marked *v* of equal height with the sides extending across the hive to which the sides are fastened. *a a* in said partition are holes cut out of the bottom of the partition for bees to pass into the inner boxes as shown by the space in the drawing being the mouth or entrance to the boxes, corresponding apertures are made in the bases of the inner boxes see Fig. 5 at S.

Q Fig. 5 is a space of about 2 inches high taken from the lower edge of the front of the outer box and is stopped with the beveled piece marked B, and in another sketch B, Fig. 3 except a small entrance at O which piece is movable to clear moths or other insects. T in Fig. 5 and F in Fig. 6 is the front of the outer box about 4 inches wide extending across the front and fastened to the ends of the sides which project about one inch in front of the partition V, leaving the space *g* in Fig. 1, and Fig. 5, for bees to ascend to their hive above or descend to the mouth *o*. E Fig. 9 is a movable shutter to the backside which inclose the two boxes which fill the large apartment and is halved at each end. The base is at *c* Fig. 1.

In Figs. 4, 5, and 7, U represents the top of the hive projecting on all sides which is not material only to have sufficient room to receive the common or other hive upon the top, which is seen in perspective at Fig. 6 with the common hive standing thereon marked *c*. Through this are two apertures marked *z, z*, one of which is covered with the stop marked *s*, corresponding ones are made in the inner boxes for bees to pass from the inner boxes to the hive common or other kind standing on the top in which the bees are swarmed and lay up their winter's stock of food. To stop these apertures as occasion requires the stop C, Fig. 3, is shoved on under the bottom of the back edge of the top hive.

C, Fig. 2, is also a stop made of tin or other thin substance to pass in at a saw-calf made in each side of the outer box Fig. 1 near *x, x* and in the center of the partition marked V, from *x* to *a*, to stop the passage of bees when putting in or removing the honey boxes, shown at A Fig. 6, and A Fig. 7.

Fig. 7 at U is an aperture through the top of the outer box of about 1 inch wide across the front directly over the aperture *g* Fig. 5 and *g* Fig. 1, made by the front board marked F Fig. 6 of the outer box, and the partition board of the same before described, a section of which in Fig. 5 is marked V and the base of which in Fig. 1 is marked V. Two of the above described apertures which are intended to be covered with stops are shown in Figs. 4 and 5 marked P.

H Fig. 1, shows the projecting part of the bottom of the hive about 2 inches beyond the front of the box as a platform or piazza on which the bees may alight. The oblique view on Fig. 7, shows the whole of the back part of the outer and inner boxes (with shutter detached) one of which is partly drawn out, each of which has glass in the back end marked *b*, likewise *b* Fig. 5.

The two inner boxes are made of thin boards large enough to lie abreast of each other and fill the large apartment of the outer box or hive, inclosed by shutter E, Fig. 9. This hive is intended to be used in connection with the common or other hive, and to be placed under it that the bees may always be furnished with sufficient room allowing them first to supply themselves for the winter in the hive in which they are swarmed. The honey then made in the above described boxes may be taken without injury to the bees by removing them, and substituting empty boxes.

What I claim as my invention, and desire to secure by Letters Patent, is—

A new and useful improvement on bee-hives, in the construction and arrangement of a box with two apartments, the largest of which is to receive boxes, the other for bees to ascend to the hive above as at $g$ Fig. 5, and at the base to communicate with the inner boxes at S. This box or hive is intended to accommodate old swarms, by placing the hive which contains the swarm above, and this beneath, which will furnish the bees with sufficient room at all times, without injury to them or causing their destruction, as herein described.

SHADRACH TRUMBULL.

Witnesses:
MINDWELL P. NORTON,
DANIEL W. NORTON.